United States Patent [19]

Anders et al.

[11] Patent Number: 4,514,151
[45] Date of Patent: Apr. 30, 1985

[54] LIQUID PULSATION DAMPENER DEVICE

[76] Inventors: Christian Anders, Weidstasse 48, D-6710 Frankenthal; Roland Beiersdörfer, Wählingstrasse 4, D-6520 Worms 24, both of Fed. Rep. of Germany

[21] Appl. No.: 324,093

[22] Filed: Nov. 23, 1981

[30] Foreign Application Priority Data

Nov. 24, 1980 [DE] Fed. Rep. of Germany ....... 3044082

[51] Int. Cl.³ .......................... F04B 11/00; F16L 55/04
[52] U.S. Cl. ..................... 417/540; 138/26; 138/30; 181/272
[58] Field of Search ................. 417/540, 542; 138/30, 138/26; 181/255, 233, 271, 272

[56] References Cited

U.S. PATENT DOCUMENTS

| 2,562,101 | 7/1951 | Hoyle | 181/255 |
| 2,712,831 | 7/1955 | Day | 138/26 |
| 2,773,455 | 12/1956 | Mercier | 417/540 |
| 3,150,689 | 9/1964 | Lieberman | 138/26 |
| 3,642,095 | 2/1972 | Fujii | 181/271 |
| 3,731,709 | 5/1973 | Glover | 138/37 |
| 3,857,413 | 12/1974 | Zahid | 138/26 |
| 3,867,963 | 2/1975 | Ballard | 138/46 |
| 4,032,265 | 6/1977 | Miller | 417/540 |

FOREIGN PATENT DOCUMENTS 586018 3/1947 United Kingdom .

Primary Examiner—Richard E. Gluck
Assistant Examiner—Peter M. Cuomo
Attorney, Agent, or Firm—McGlew and Tuttle

[57] ABSTRACT

The invention relates to a liquid pulsation dampener device for use in a piping network, including at least one hydro-pneumatic vibration dampener arranged at the delivery side of a positive-displacement pump. Such pumps are apt to impose normally undesirable periodic fluctuations or pulsations upon the liquid flow. The invention aims at providing a device suitable for manufacture at low cost and requiring a minimum of space while largely reducing pulsations of flow and of pressure in a piping network. In accordance with the invention, there is, at the delivery side of the positive-displacement pump and in addition to the hydro-pneumatic vibration dampener, a dynamically acting vibration dampener, and the hydro-pneumatic vibration dampener is arranged in a by-pass between the pump and the dynamically acting vibration dampener. The latter is designed for the attenuation of vibrations of higher frequencies, whereas the hydro-pneumatic vibration dampener is designed for the attenuation of low-frequency vibrations.

4 Claims, 3 Drawing Figures

LIQUID PULSATION DAMPENER DEVICE

FIELD OF THE INVENTION

The invention relates to a liquid pulsation dampener device for use in a piping network, including at least one hydro-pneumatic vibration dampener arranged at the delivery side of a positive-displacement pump.

BACKGROUND OF THE INVENTION

A flow of liquid, such as water or oil, can be established in a piping network, by means of oscillating positive-displacement pumps which are commonly reciprocating pumps or diaphragm pumps. Due to the dynamics of producing pressure e.g. by a crank-drive reciprocating pump, some periodic fluctuation or pulsation is imposed upon the displaced volume or liquid flow, depending on the type of motion of the drive. Such pulsations of pressure and flow are undesirable not only for the user who as a rule requires a very steady flow, but also because of the risk that the service life of various components of the piping network, e.g. of valves and instruments, may suffer severe detrimental effect. Since liquids such as water are relatively incompressible, there may occur in the piping network vibrations or pulsations the amplitudes of which may, unless dampened, reach 12 to 15 (1 b−1 bar=$10^5 N/m^2$) with a pressure level of about 200 (1 b=1 bar=$10^5 N/m^2$ at the delivery side. The frequencies of such vibrations or pulsations depend on the speed or working frequency of the positive-displacement pump on the one hand and on the structure of the piping network on the other hand. Heretofore, so-called air chambers or antifluctuators have been used for dampening liquid pulsations. Such devices required considerable maintenance. More recently, hydro-pneumatic antishock devices have been rather widely installed in piping networks for attenuating pulsations. These devices are also termed absorption dampeners and require much less maintenance work.

U.S. Pat. No. 3,628,573 to Loliger et al, discloses a hydro-pneumatic pulsation dampener comprising a resilient diaphragm within a housing composed of two shells. A chamber containing a volume of gas is separated by means of this diaphragm from another chamber through which the liquid passes. Thus any such hydro-pneumatic vibration dampener will contain, within a receptacle, a gas volume separated from the liquid by a movable wall, in particular by a diaphragm or a piston. Attenuation is due to the hydraulic coupling between the displacer's motion and the liquid in the piping network being presented to the gas cushion mentioned, in which the compressibility of the gas is exploited for dampening.

Absorption dampeners or hydro-pneumatic vibration dampeners of this type are arranged in a by-pass for reasons of strength and ease of maintenance. In view of the dependence of the extent of pulsation on the pump delivery pressure, it would be possible to employ other absorption dampeners having different characteristics for varying pressures or generally high requirements to the suppression of pulsations. Alternatively, the number of absorption dampeners might be increased. However, the expenditures involved would be out of proportion to the residual pulsation remaining.

Aside from absorption dampeners, reflection pulsation dampeners have come into use, designed as resonators based on dynamic action principles. The effect of such reflection dampeners is due to a partial reflection of an oncoming sound wave at the location of a ramification or of a brusque change of cross section in a pipeline, as the condition for continuity of acoustic pressure and of sound propagation must be satisfied. Such reflection dampeners are devoid of movable mass-carrying components. A particular embodiment is described in U.S. Pat. No. 3,731,709; to Glover, which features, within a housing, deflection means comprising two spaced manifold plates in which there are nozzle bores for passing the liquid. The liquid is made to move in an orbital-flow or spin pattern by these deflection means.

While the conventional reflection dampeners require practically no maintenance, they are disadvantageous in that for attaining small residual pulsation, they must have large volumes or even several chambers. Moreover, the overall length will increase, the lower the frequency of the vibration wave in the piping network is. The resulting large space requirement and the considerable cost involved have brought about some restrictions on the use of reflection dampeners despite their satisfactory attenuation owing to the arrangement in the main flow path.

SUMMARY OF THE INVENTION

It is an object of the invention to provide a dampener device suitable for manufacture at low cost and requiring a minimum of space while adapted to largely reduce pulsations of flow and of pressure in a piping network.

It is another object of the invention to enable pulsation smoothing at costs which are in a reasonable relation to the additional expenditure involved for a dampener device that is to be largely independent of the piping structure as well as of the delivery pressure and speed of the pump used.

Yet another object of the invention consists in providing a device suited for attaining a residual pulsation of centrifugal pump quality, i.e. of less than ±1 percent of the working pressure.

It is a further object of the invention to create a rugged dampener device of high operational reliability so as to withstand rough service conditions.

In a dampener device of the type initially mentioned hereinabove, the invention provides, basically, at the delivery side of the positive-displacement pump and in addition to the hydro-pneumatic vibration dampener, a dynamically acting vibration dampener. The hydro-pneumatic vibration dampener is arranged in a by-pass between the pump and the dynamically acting vibration dampener which latter is designed for the attenuation of higher frequencies whereas the hydro-pneumatic vibration dampener is designed for the attenuation of low-frequency vibrations.

The device according to the invention is distinguished by a structure of simple, very compact and economical design. It also produces a high degree of pulsation smoothing. To an unexpected extent, the residual pulsation is independent of the piping network construction as well as of the pressure and speed or working frequency of the positive-displacement pump. This permits universal utilization of the dampener device. As in accordance with the invention, a hydro-pneumatic vibration dampener (absorption dampener) and a dynamically acting vibration dampener are in series, the remaining fluctuations or residual pulsations are in a range below ±1 percent of the working pressure. Due to the functional assignment of attenuating pulsations in a combined absorption-reflection dampener system, the volume required is considerably smaller than with conventional reflection dampener systems alone. The absorbing hydro-pneumatic vibration dampener substantially serves to balance or smooth the unsteady delivery (fundamental frequency) of the positive-displacement pump whose working speed or frequency is the cause of low-frequency fluctuations. The special design and dimensions of the hydro-pneumatic vibration dampener assure that such low-frequency fluctuations or pulsations are particularly attenuated in accordance with the invention. The remaining residual pulsations, of higher order but of small amplitudes, are largely removed in the dynamically acting vibration dampener arranged downstream. As compared to the conventional devices, the overall residual pulsation is extremely small. In addition, the piping network is acoustically separated from the positive-displacement pump. There are no difficulties in adapting the deivce of the invention to special operative conditions, or to dimensioning it accordingly. Consequently, the small residual pulsation remaining allows optimum design and exploitation of the piping network. There is yet another important advantage of the device according to the invention. It will be remembered that low-frequency vibrations acting on a hydro-pneumatic vibration dampener are liable to produce therein additional vibrations, in particular of higher frequencies, which is due to the fact that the hydro-pneumatic vibration dampener itself represents, with its movable masses, a vibration generator. Now the device of the invention assures that such additional vibrations emanating from the hydro-pneumatic vibration dampener are attenuated in the dynamically acting vibration dampener which is immediately downstream of the hydro-pneumatic dampeners.

In a preferred embodiment of the invention, the hydro-pneumatic vibration dampener comprises a gas-filled bladder or a diaphragm chamber system. Any such dampener system includes a gas cushion and operates on the absorption principle. Its design is relatively economical and its technical characteristics can easily be tuned to various conditions of utilization.

Expediently, the dynamically acting vibration dampener may be a reflection-type dampener comprising an attenuation chamber designed for through-flow of the liquid. Such dampeners are preferred for use with positive-displacement pumps or reciprocating pumps operating at medium to high speeds. Where a very high speed pump is employed, another embodiment of the invention provides for deflector means within the attenuation chamber, thus also producing an absorbing effect.

It is of particular advantage to arrange the two vibration dampeners of a device according to the invention in series immediately behind each other. Therefore, the amplitudes of higher order residual pulsations occuring downstream of the hydro-pneumatic vibration dampener can be kept unusually small and the volume required for the dynamically acting vibration dampener immediately behind it can be cut down to a minimum. Furthermore, the arrangement of the two dampeners in immediate series results in an especially effective reduction of noise in the piping network.

By another preferred embodiment of the invention, the hydro-pneumatic vibration dampener and the dynamically acting or reflection vibration dampener are combined in a single unit. Such a packaged unit requires very little space and is adapted for economical manufacture and assembly, the more so since only two connections to the piping network will be needed. As any connection line between the two dampeners can be dispensed with, the residual higher order pulsations of the hydro-pneumatic vibration dampener may have small amplitudes and, consequently, the downstream dynamically acting vibration dampener may be of correspondingly small dimensions. Also, such a packaged unit provides for particularly good noise reduction.

It is preferred to provide a single housing for the two dampeners and to divide the housing interior into two chambers by means of a partition wall such that one chamber which includes an entrance opening accomodates the hydro-pneumatic vibration dampener and the other chamber which includes a delivery opening accomodates the dynamically acting vibration dampener.

In a preferred embodiment, the one chamber which includes an entrance opening comprises a receptacle in which there is a preferably gas-filled bladder and in which there is at least one bore leading to said one chamber. Such a receptacle contains the the hydro-pneumatic vibration dampener and is well suited for incorporation in the housing so that maintenance or repair work will be greatly facilitated. This embodiment also lends itself to cost-saving manufacture.

According to another preferred feature of the invention, the entrance opening of the one chamber subtends an angle, preferably of about 90 degrees, to the longitudinal axis of the housing. Thus the liquid stream is deflected within the chamber that contains the hydro-pneumatic vibration dampener, and there is an optimum effect of the latter on the liquid pulsations. Advantageously, the partition wall of the housing is convex toward the receptacle and the end wall opposite thereto which includes the delivery opening is convex toward the exterior. These convex faces serve to enhance stability as well as the dampening action. Further features and advantages of the invention will be apparent from the following detailed description of exemplary embodiments illustrated.

DESCRIPTION OF THE PREFERRED EMBODIMENT

Figure 1:
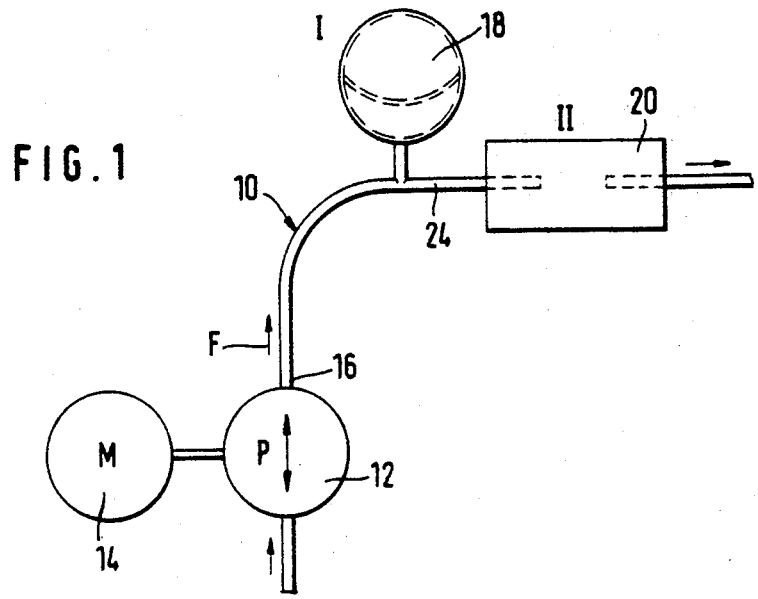
FIG. 1 is a diagrammatic representation of a piping network including dampener means according to the invention.

In FIG. 1, there is shown a piping network 10 with a reciprocating pump 12 driven by a motor 14, which may be an electric motor. The direction of fluid flow is indicated by arrows F. In conduit 16 at the delivery side, there is a hydro-pneumatic dampener 18, downstream of which there is another dampener 20, e.g. of the type disclosed in U.S. Pat. No. 3,731,709. The hydro-pneumatic dampener 18 may be of the gas-filled bladder type. The order or sequence of these two dampeners 18 and 20 is important. Immediately behind the delivery-side outlet of pump 12, the two dampeners must be arranged such that the pipe pieces between pump 12 and the dampeners 18 and 20, respectively, are as short as possible.

In accordance with the invention, a residual pulsation of less the ±1 percent of the working pressure can be attained, largely irrespective of the piping system used and independent of the delivery pressure and the speed of pump 12. The liquid downstream of the two dampeners 18, 20 will then have a residual pulsation resembling that of centrifugal pumps.

Figure 2:
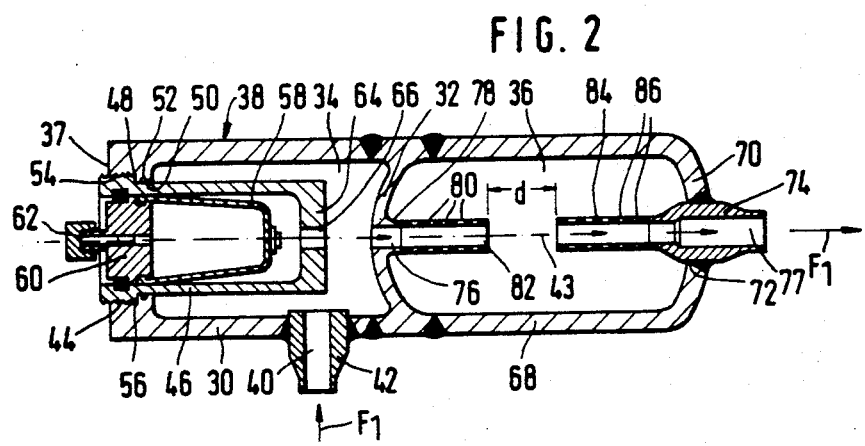
FIG. 2 is a longitudinal sectional view of a unit comprising two dampeners according to the invention and FIG. 3 is a sectional view similar to that of FIG. 2 of a unit comprising deflecting means in dynamically acting dampeners.
Figure 3:
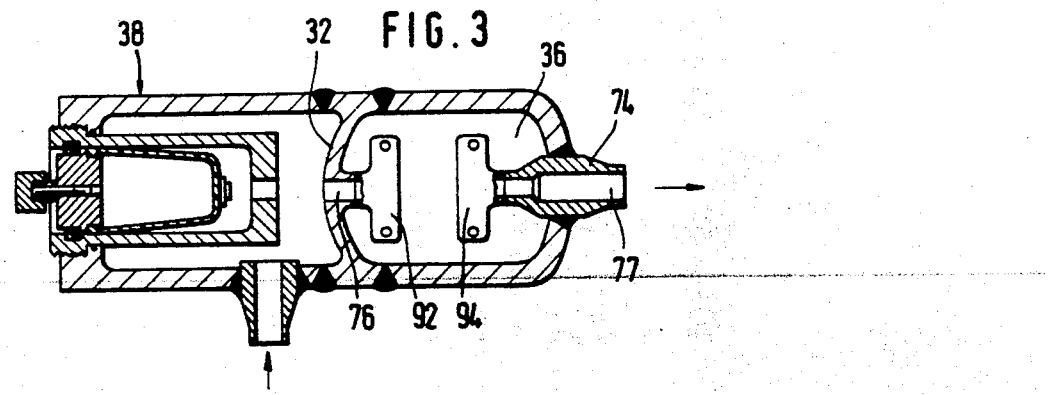

In any case, the two dampeners 18, 20 can be separated spatially though such separation should be avoided as the amplitudes of residual higher order pulsations would be increased by a longer connection line 24 between dampener 18 and dampener 20 so that the latter would have to be made larger than in a combined unit. Moreover, some part of the advantage of reduced noise would be lost with such an arrangement. For these reasons, a combined structure of the two dampeners 18 and 20 is preferred according to the invention. FIGS. 2 and 3, respectively, show two different such embodiments.

The unit of FIG. 2 comprises a housing 30 divided into two chambers 34 and 36 by a partition wall 32. A cage 38 encompassing chamber 34 is provided with an entrance opening 40 to which a connection piece 42 is welded. Subject to the particular constructional requirements, entrance opening 40 may subtend any angle to longitudinal axis 43.

At the front part of cage or housing 38, there is a port 44 provided with a female thread into which a receptacle 46 is screwed that occupies a substantial volume of chamber 34. Port 44 has a stepped portion 48 forming the transition of wider port 44 to a recess 50 the inner wall of which houses a seal 52. Receptacle 46 has a male threaded portion 54 so that it can be screwed into the interior of port 44 until a shoulder 56 of receptacle 46 engages the stepped portion 48. A bladder 58 is attached within receptacle 46 by means of a holder 60 such that the interior of bladder 58 is accessible only via a stopper 62. Bladder 58 is filled with nitrogen.

Receptacle 46 includes at its end wall within chamber 34 a bore 66 providing flow connection between chamber 34 and the volume surrounding bladder 58. The latter and receptacle 46 form a hydro-pneumatic dampener that may be called a gas cushion attenuator.

Chamber 36 is encased by another housing portion whose free face wall 70 has, opposite to partition wall 32, a throat 72 into which a second connection piece 74 is welded. Partition wall 32 also includes a bore 76 for flow connection between the two chambers 34 and 36. Inside chamber 36, bore 76 is surrounded by a collar 78 to which a tube 82 is joined that is provided with transverse bores 80. Tube 82 is attached such that the axes of bore 76 and of tube 82 are aligned. Connection piece 74 includes a delivery opening 77. A second tube 84 that is also provided with transverse bores 86 is secured to the inner end of connection piece 74 so that tube 84 is in alignment with tube 82. The ends of these two tubes are spaced by a distance d.

It will now be seen that a fluid or liquid flows in the direction of arrow F 1 through connection piece 42 into chamber 36 and via tube 84 outwardly through connection piece 74. As mentioned hereinbefore, chamber 34 comprises a gas cushion dampener and chamber 36 comprises a reflection dampener. Thus a two-part dampening system is created wherein the dampener of chamber 34 serves to balance the unsteady delivery provided by pump 12 (fundamental frequency). Residual pulsations of higher order will remain, but they are of lesser amplitudes which are well-nigh absorbed in the reflection dampener of chamber 36. Thus the overall residual pulsation attained by the embodiment of FIG. 2 is smaller than ±1 percent of the working pressure. In addition, this system provides for a complete acoustic separation of piping network 10 from pump 12. The flow direction through the dampener unit of FIG. 2 is not reversible.

Another embodiment of the invention is shown in the sectional view of FIG. 3. The housing there comprises cage 38 terminated by partition wall 32 to which chamber 36 encompassing the dynamic dampener is joined. To transverse bore 76 and connection piece 74, respectively, one deflector each, 92 and 94, respectively, are connected, substituting for the tubes with transverse bores. Whereas the embodiment of FIG. 2 is recommendable for reciprocating pumps operating at normal to medium speeds, the system shown in FIG. 3 is suitable for high-speed pumps as the deflectors 92, 94 will assist the action of the absorbing dampener chamber, viz. the action of the dampener housed in chamber 34.

While preferred embodiments have been illustrated and elucidated hereinabove, it should be understood that numerous variations and modifications will be apparent to one skilled in the art without departing from the principles of the invention which, therefore, is not to be construed as being limited to the specific forms described.

We claim:

1. A liquid pulsation dampening arrangement for use in a piping network having a positive displacement pump with a delivery side for delivering fluid to the network in a flow direction comprising:

a hydro-pneumatic dampener having a first chamber with a bladder member therein for separating a pneumatic fluid space from a liquid fluid space in said first chamber;

a first connection from said network downstream of said pump delivery side to said liquid fluid space;

a dynamic dampener having a second chamber with an inlet, an outlet and the means extending from said inlet and outlet for reducing vibrations in the liquid fluid;

a second connection in the network between said first connection and said second chamber inlet for connecting said dynamic dampener downstream of said hydropneumatic dampener in said network;

said means for reducing vibrations comprising a first pipe section extending from said inlet into said second chamber and a second pipe section extending from said outlet into said second chamber, said first and second pipe sections separated by a selected spacing in said second chamber;

a housing defining said second chamber and a third chamber, said first chamber defined in said third chamber, said first connection comprising an opening into said third chamber and an opening between said first chamber and said third chamber, said dynamic dampener inlet extending between said third chamber and said second chamber;

said housing including a longitudinal axis, said dynamic inlet and outlet and said opening between said first and third chambers axially aligned along said longitudinal axis, said first connection opening into said third chamber extending at an angle to said longitudinal axis; and a partition which is convex toward said third chamber extending across said housing before dividing said housing into said third and second chambers, said dynamic dampener inlet extending centrally through said partition.

2. An arrangement according to claim 1, including a deflector connected to the end of each pipe section in said second chamber for deflecting liquid fluid as it passes from said inlet into said second chamber and from said second chamber into said outlet.

3. An arrangement according to claim 1, wherein each of said first and second pipe sections include axially aligned end openings facing each other and radially extending perforations.

4. An arrangement according to claim 1, wherein said housing includes a convex wall of said second chamber facing away from and opposite said partition through which said dynamic dampener outlet extends centrally.

* * * * *